US011922360B2

(12) United States Patent
Kairali et al.

(10) Patent No.: US 11,922,360 B2
(45) Date of Patent: Mar. 5, 2024

(54) MANAGING DELIVERY BY UTILIZING MULTIPLE VEHICLES

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/592,892

(22) Filed: Feb. 4, 2022

(65) Prior Publication Data

US 2023/0252394 A1 Aug. 10, 2023

(51) Int. Cl.
*G06Q 10/083* (2023.01)
(52) U.S. Cl.
CPC .................................. *G06Q 10/083* (2013.01)
(58) Field of Classification Search
CPC ...................................................... G06Q 10/083
See application file for complete search history.

(56) References Cited

U.S. PATENT DOCUMENTS

| | | | |
|---|---|---|---|
| 10,373,097 B2 | 8/2019 | Kulkarni | |
| 2018/0137454 A1* | 5/2018 | Kulkarni | B64C 39/024 |
| 2018/0189717 A1* | 7/2018 | Cao | G06Q 50/30 |
| 2019/0392371 A1* | 12/2019 | Kline | G06Q 10/083 |
| 2021/0295246 A1* | 9/2021 | Yamamoto | G06Q 10/087 |
| 2022/0101261 A1* | 3/2022 | Wiacek | G06Q 50/28 |

FOREIGN PATENT DOCUMENTS

| | | | |
|---|---|---|---|
| CN | 112005258 A | 11/2020 | |
| EP | 3786860 A1 * | 3/2021 | ............ G06F 16/29 |

OTHER PUBLICATIONS

Macias et al., "Optimal hub selection for rapid medical deliveries using unmanned aerial vehicles", Transportation Research Part C: Emerging Technologies, vol. 110, pp. 56-80, 2020 (Year: 2020).*
"Method and System for Enabling Package Delivery via Autonomous Vehicle", An IP.com Prior Art Database Technical Disclosure, Authors et. al.: Disclosed Anonymously, IP.com No. IPCOM000258454D, IP.com Electronic Publication Date: May 13, 2019, 4 pages.
"Method and System for Optimization of "No-Entry" Timing in a Smart City", An IP.com Prior Art Database Technical Disclosure, Authors et. al.: Disclosed Anonymously, IP.com No. IPCOM000259730D, IP.com Electronic Publication Date: Sep. 11, 2019, 5 pages.

* cited by examiner

*Primary Examiner* — Rupangini Singh
(74) *Attorney, Agent, or Firm* — Monchai Chuaychoo

(57) ABSTRACT

An approach for managing delivery of packages utilizing one or more vehicles is disclosed. The approach includes loading delivery vehicles in a such a way that, based on contextual need of offloading of the packages from the delivery vehicles, the approach will selectively offload the packages from the delivery vehicle to on-demand warehouse as service location along the route of the delivery vehicle. The delivery vehicles can proactively analyze various contextual situation, and can identify which and how much products are to be off-loaded from the delivery vehicles, and can proactively book warehouse as a service location along with the route of the delivery vehicle so that the products can be transferred from a transportation vehicle to on-demand warehouse as a service location effectively and efficiently.

20 Claims, 4 Drawing Sheets

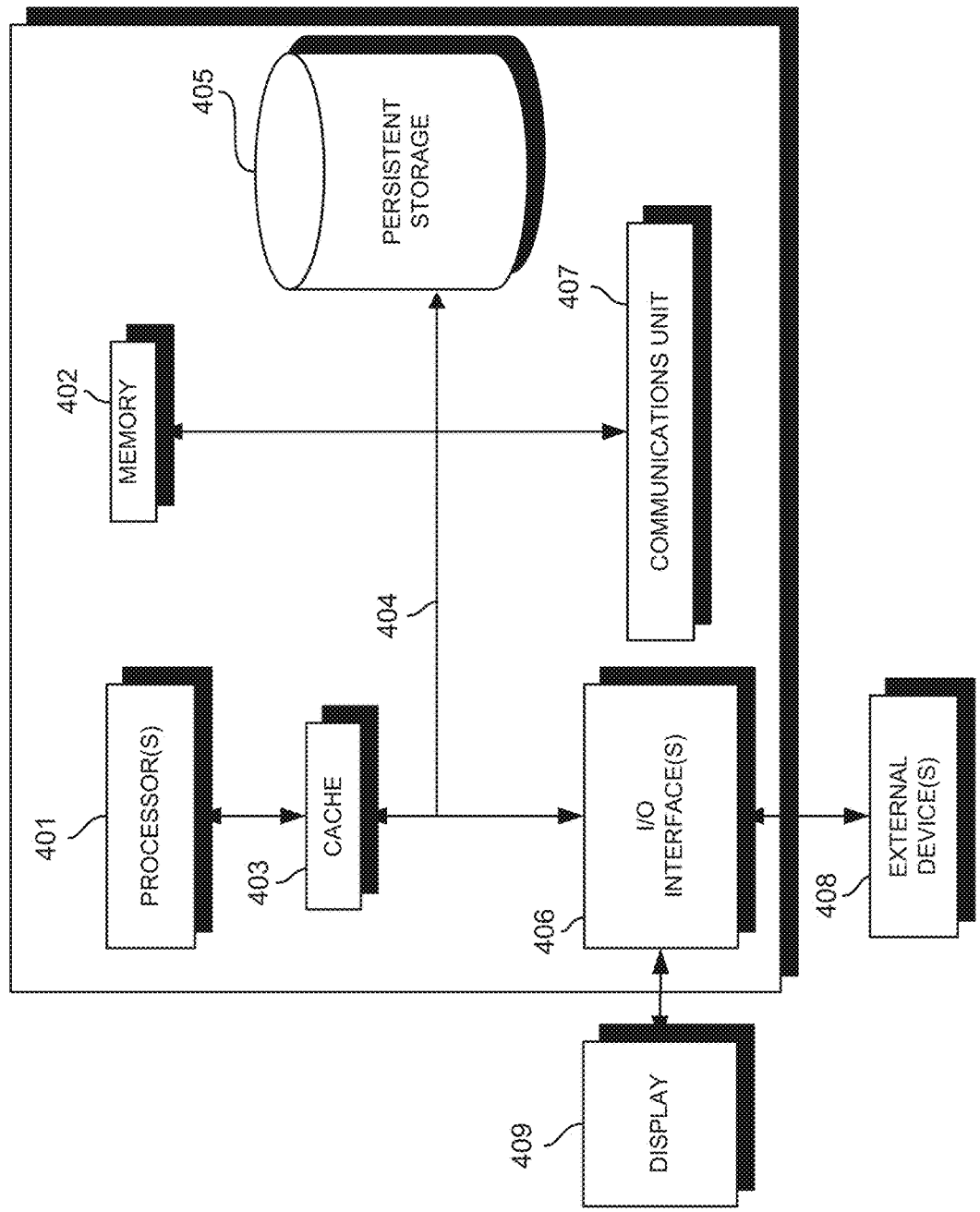

MANAGING DELIVERY BY UTILIZING MULTIPLE VEHICLES

BACKGROUND

The present invention relates generally to the field of transportation, and more particularly to managing delivery vehicles.

The movement of transportation vehicle can depend on various factors, like road width, traffic condition and road condition. However, there are some external factors not associated delivery such as road restrictions. For example, some cities have restricted the movement of heavy commercial traffic during peak hours as city traffic becomes affected due to their bulky size and speed limitations. Thus, if a recipient of a package lives in a city with commercial traffic restriction, then products may not be delivered in a timely manner.

SUMMARY

Aspects of the present invention disclose a computer-implemented method, a computer system and computer program product for managing delivery of packages utilizing one or more vehicles. The computer implemented method may be implemented by one or more computer processors and may include, loading one or more packages onto a large vehicle for a delivery route; identifies one or more travel restrictions at a delivery destination; determining priority designation of one or more packages associated with the delivery route; determining one or more alternative routes based on the one or more travel restrictions and the priority of the one or more packages; determining one or more vehicles suitable for the one or more alternative routes and conforms to the one or more travel restrictions; selecting a first vehicle from the one or more vehicles to deliver the one or more packages to the delivery destination; unloading a high priority designation package from the one or more packages from the large vehicle; loading the high priority designation package from the one or more packages onto the first vehicle; and delivering the high priority designation package to the delivery destination.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which:

FIG. 4 depicts a block diagram, designated as 400, of components of a server computer capable of executing the delivery component 111 within the delivery management environment 100, in accordance with an embodiment of the present invention.

DETAILED DESCRIPTION

Figure 1:
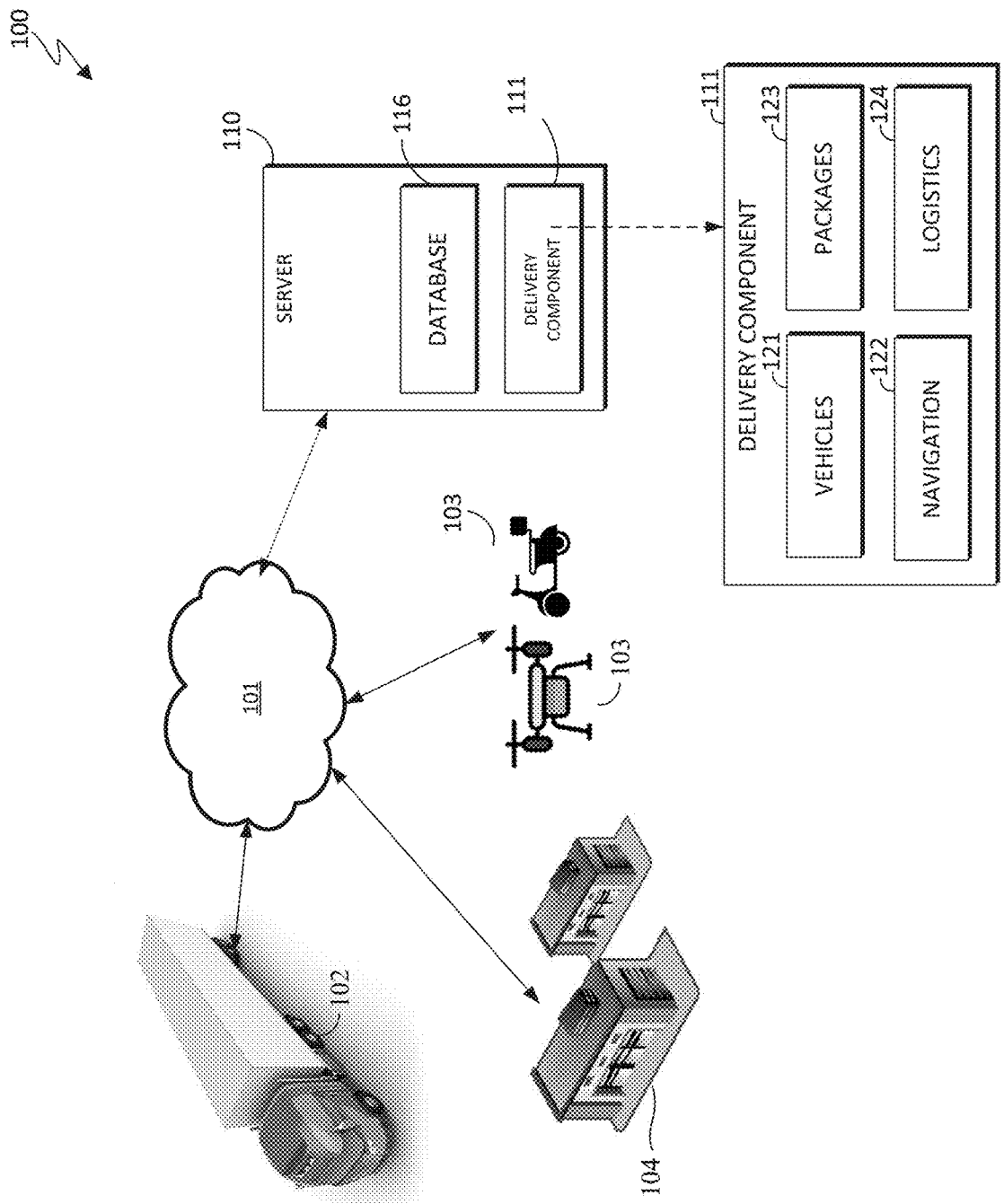
FIG. 1 is a functional block diagram illustrating a delivery management environment, designated as 100, in accordance with an embodiment of the present invention.

The current state of art as it pertains delivering packages into densely populates cities, can present some challenges. One challenge, involves local/city laws that regulates and limits the use of commercial vehicle between certain times (such as rush hour). For example, some large and densely populated cities bans large delivery vehicles (e.g., 18 wheeler, etc.) between 8 AM and 5 PM during weekdays. However, smaller vehicle, like two-wheeler delivery bike is allowed to traverse the streets freely at any hour. Thus, certain deliveries to occupants in the city may not receive their package in a timely manner. This becomes problematic when the items include perishable goods (e.g., produce, seafood, etc.) destined for restaurants inside the city.

Embodiments of the present invention recognizes the deficiencies in the current state of art as it relates to delivering products in a city that has traffic laws prohibiting certain types of vehicles during a certain time period, provides an approach. One approach comprises of proactively transferring the packages on to smaller vehicles as not to waste time and/or expiry of packages that are perishable.

Other embodiments have the capability of loading delivery vehicles in such a way that, based on contextual need of offloading of the packages from the delivery vehicles, the approach can selectively offload the packages from the delivery vehicle to on-demand warehouse as service location on the route of the delivery vehicle. The delivery vehicles can proactively analyze various contextual situation, and will identify which and how much products are to be offloaded from the delivery vehicles, and will proactively book warehouse as a service location along with the route of the delivery vehicle so that the products can be transferred from transportation vehicle to on-demand warehouse as a service location effectively and efficiently.

It should be understood that the Figures are merely schematic and are not drawn to scale. It should also be understood that the same reference numerals are used throughout the Figures to indicate the same or similar parts.

FIG. 1 is a functional block diagram illustrating a delivery management environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Delivery management environment 100 includes network 101, large delivery vehicle 102, small delivery vehicle 103 and warehouse 104.

Network 101 can be, for example, a telecommunications network, a local area network (LAN), a wide area network (WAN), such as the Internet, or a combination of the three, and can include wired, wireless, or fiber optic connections.

Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, large delivery vehicle 102, small delivery vehicle 103 and other computing devices (not shown) within Delivery management environment 100. It is noted that other computing devices can include, but is not limited to, large delivery vehicle 102, small delivery vehicle 103 and any electromechanical devices capable of carrying out a series of computing instructions.

Large delivery vehicle 102 is a group of vehicles that has the capacity to carry 500 kilograms or more. This could be land and/or sea-based vehicles can include, but it's not limited to, 18-wheeler, box trucks (e.g., 10-20 feet), etc. Large delivery vehicle 102 can be autonomous or non-autonomous.

Small delivery vehicle 103 is a group of vehicles that has the capacity to carry 500 kilograms or less. This could be land and/or sea-based vehicles can include, but it's not limited to, two-wheel bikes, three-wheel bikes, small van and drones. Small delivery vehicle 103 can be autonomous or non-autonomous.

Warehouse 104 is a location used to store packages to be sorted and delivered to its final destination. Alternatively, warehouse 104 can be a temporary space that can be booked on short notice (i.e., on-demand warehouse).

Embodiment of the present invention can reside on server 110. Server 110 includes delivery component 111 and database 116.

Delivery component 111, based on machine learning, provides the capability of, but is not limited to, i) managing delivery vehicles, ii) managing loading and unloading of packages associated with the delivery vehicles, iii) booking on-demand warehouses, iv) learning routes between delivery points including any traffic regulations associated with the route and v) learning weather and traffic patterns.

Delivery component 111 includes subcomponents/modules, such as, vehicle module 121, navigation module 122, packages module 123 and logistics module 124.

As is further described herein below, vehicles module 121 of the present invention provides the capability of managing (e.g., instructing, commanding, etc.) vehicles for delivery of packages. Vehicles can include large vehicles, such as 18 wheelers and smaller ones like a drone and/or two wheelers. For example, drone can transfer the packages to a temporary warehouse location on the route or the packages can be carried to be stored in the temporary warehouse location (awaiting for the arrival of the next delivery vehicle).

As is further described herein below, navigation module 122 of the present invention provides the capability of identifying routes associated with the delivery of packages including legal restrictions, such as which city (or area/ section of a city) has prohibition for large commercial vehicle during a certain hours.

In other embodiment, navigation module 122 can learn about traffic regulations between routes. For example, if larger transportation vehicles are not allowed to travel between a particular time ranges and in any selected route of a city, then the system can arrange an appropriate smaller delivery vehicles in a proactive manner, so that the packages can be transferred from larger transportation vehicle to smaller transportation vehicle.

In other embodiment, navigation module 122 can consider the transportation regulation parameters (e.g., like no entry for any specified time range, contextual situation, route etc.), vehicle health condition, traffic condition, cost of warehouse as service, selection of types of delivery vehicles (e.g., large, small, medium, two wheelers, etc.). Navigation module 122 can analyze and determine optimum route(s) so that transportation cost is minimum.

As is further described herein below, packages module 123 of the present invention provides the capability of determining prioritization of packages. Some packages may contain perishable items may be designated as high/rush priority. Other packages, such as, paper and pencils may be designated as low priority. High priority items may have a delivery guarantee of 48 hours or less. It is noted that customers may request packages to have a certain priority designation by paying for that delivery service. Medium priority items may have 2-7 days guarantee delivery service. Low priority items may have a 7 day guarantee delivery service.

Other functionality of packages module 123 includes, i) classification and ii) grouping of packages. Classifications of packages can be based on similar location delivery, and associated dimension, shape, and properties of the packages as larger vehicles are loaded. Packages can be logically grouped and can be kept in a packaging pallet, so that multi-drone lifting mechanism can lift the pallet with the packages.

As is further described herein below, logistics module 124 of the present invention provides the capability of coordinating loading and unloading of packages onto delivery vehicles. This may include loading at the beginning of transit and loading/unloading multiple times until the package arrives at its final destination. Logistics module 124 may select high priority packages (from packaging module 123) to be loaded last or first, depending on the vehicle and route. Logistics module 124 is capable of coordinating vehicles for delivery (via vehicles module 121) and determining the final route (via navigation module 122). Furthermore, logistics module 124 is capable of booking on-demand warehouses that could be useful as waypoints along a delivery route in case there are road (e.g., traffic congestion or road probation during certain hours, etc.) and/or weather restrictions.

Other capabilities and functionality logistics module 124 can include, but it is not limited to, i) can identify various physical locations, where those locations opted for warehouse as a service (i.e., a physical area which can be rented for warehouse or the physical location can be, roof top, office building etc., which can be taken as temporary warehouse), ii) can identify how long the products are to be transported, and if smaller vehicle is more/less effective or larger vehicle is most effective, iii) can consider multi-vehicle transportation to optimize the cost, like longer distance can be covered by larger transportation vehicle, and with smaller vehicle the products can be delivered to customer location, iv) while the products are being transported, logistics module 124 can identify whether the packages are to be transferred to the different vehicles, v) can identify the time gap between the alternate vehicle to receive the packages, vi) can identify if on demand warehouse as a service location to store the packages for a temporary duration, vii) the delivery vehicle can book appropriate warehouse where the packages are to be moved on a temporary basis, viii) can identify which packages are to be moved to different vehicle, and the vehicle is not yet available, ix) can identify how many smaller vehicles may be required, and will be transferred from the temporary warehouse location, x) can leverage block chain technology for the warehouse as a service, in this case, block chain technology can consider and ensure which warehouses can be used and have required facilities, xi) can identify the complete optimized transportation route, with combination of different vehicles so that overall transportation cost is minimum, xii) when the alternate vehicle has arrived, any drone-based vehicle can load packages onto the smaller vehicle from the temporary warehouse location and xiii) can "release" (i.e., unbook or cancel booking)) on-demand warehouse space if logistics module 124 determines that there is no need to occupy the warehouse space.

In other embodiment, logistics module 124 may load delivery vehicles in a such a way that, based on contextual need of offloading of the packages from the delivery vehicles, logistics module 124 can selectively be offloading (i.e., unload) the packages from the delivery vehicle to on-demand warehouse as a service location (on the route of the delivery vehicle). In an example, logistics module 124 can proactively plan on how different vehicles (e.g., large, small, medium, etc.) can be used for transportation, and accordingly arrange the appropriate vehicle(s). Additionally, the system can arrange warehouse as a service location so that transportation of packages is effective.

In other embodiment, logistics module 124 may proactively analyze various contextual situation, and can identify which and how much products are to be offloaded from the delivery vehicles, and can proactively book warehouse (as a service location along with the route of the delivery vehicle) so that the products can be transferred from transportation vehicle to on-demand warehouse (as a service location) effectively. In another example relating to the offloading functionality, the packages can be grouped and arranged on the delivery vehicle in such way that, effective offloading of the packages can be done from the transportation vehicle such as the use of a multi-drone coupling mechanism for offloading of the packages from the transportation vehicle.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within Delivery management environment 100 via network 101. In another embodiment, server 110 represents a computing system utilizing clustered computers and components (e.g., database server computers, application server computers, etc.) that act as a single pool of seamless resources when accessed within Delivery management environment 100.

Database 116 is a repository for data used by delivery component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within Delivery management environment 100, provided that delivery component 111 has access to database 116. Database 116 may store information associated with, but is not limited to, knowledge corpus of delivery vehicles (including location, availability, package capacity, fuel used, etc.), navigation maps including any road prohibition, real-time traffic and weather information, location of warehouses (e.g., on demand, fixed, etc.), prioritization of packages, category of packages and availability of drivers (for non-autonomous vehicle).

The following diagram (FIG. 2) illustrates how delivery component 111 delivers a package from originating warehouse 104 to a customer 220. The main route (i.e., 201) between warehouse 104 and customer has travel restrictions (i.e., 202) for large vehicle (i.e., 102) where large vehicles are now allowed into the city (where customer 220 resides) between the hours of 8 AM to 5 PM during weekdays. Customer 220, who owns a restaurant, ordered a crate of special seafood delicacy (i.e., 210) that must arrive within 48 hours. The shipping company was plan on making one bulk delivery to other restaurants in the city later in the evening after 5 pm since there is a restriction for large vehicle. Delivery component 111 recognizes the package 210 of customer 220 is perishable and requires a fast delivery. Delivery component 111 manages unloading off package 210 and determines that smaller vehicles (i.e., 103), such as a drone or two-wheeler would be much suited to deliver the package into the city. Thus, delivery component 111 instructs drone to unload the package from large vehicle 102 and proceeds to load it onto a two-wheel vehicle (i.e., 103) wherein the two-wheel vehicle can proceed to a smaller distribution warehouse where it's unloaded onto another two-wheeler. The final two-wheeler is able to quickly deliver package 210 to customer 220 within the 48-hour time limit.

Figure 2:
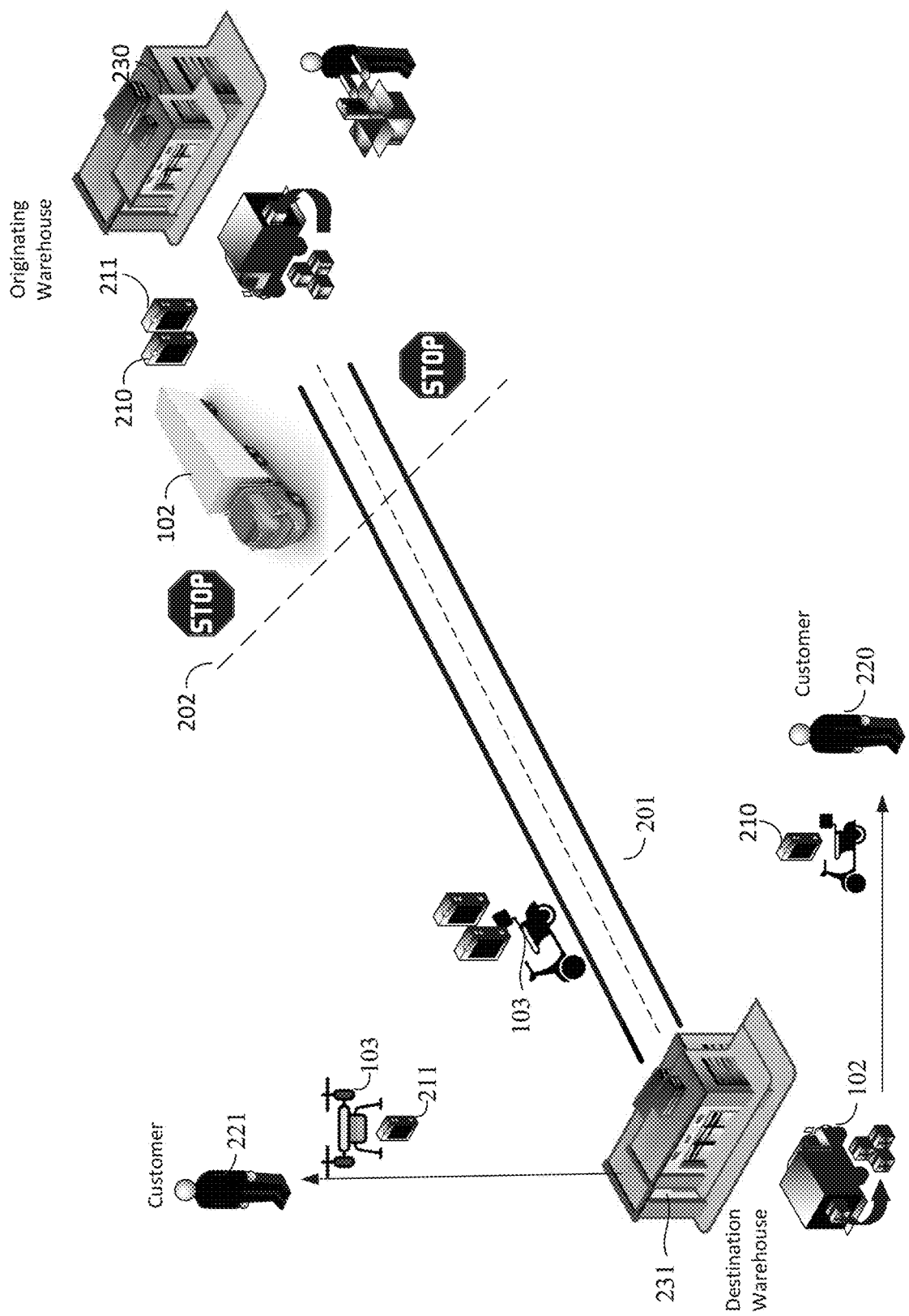
FIG. 2 is an example of a scenario that illustrate the functionality of delivery component 111, in accordance with an embodiment of the present invention.
Figure 3:
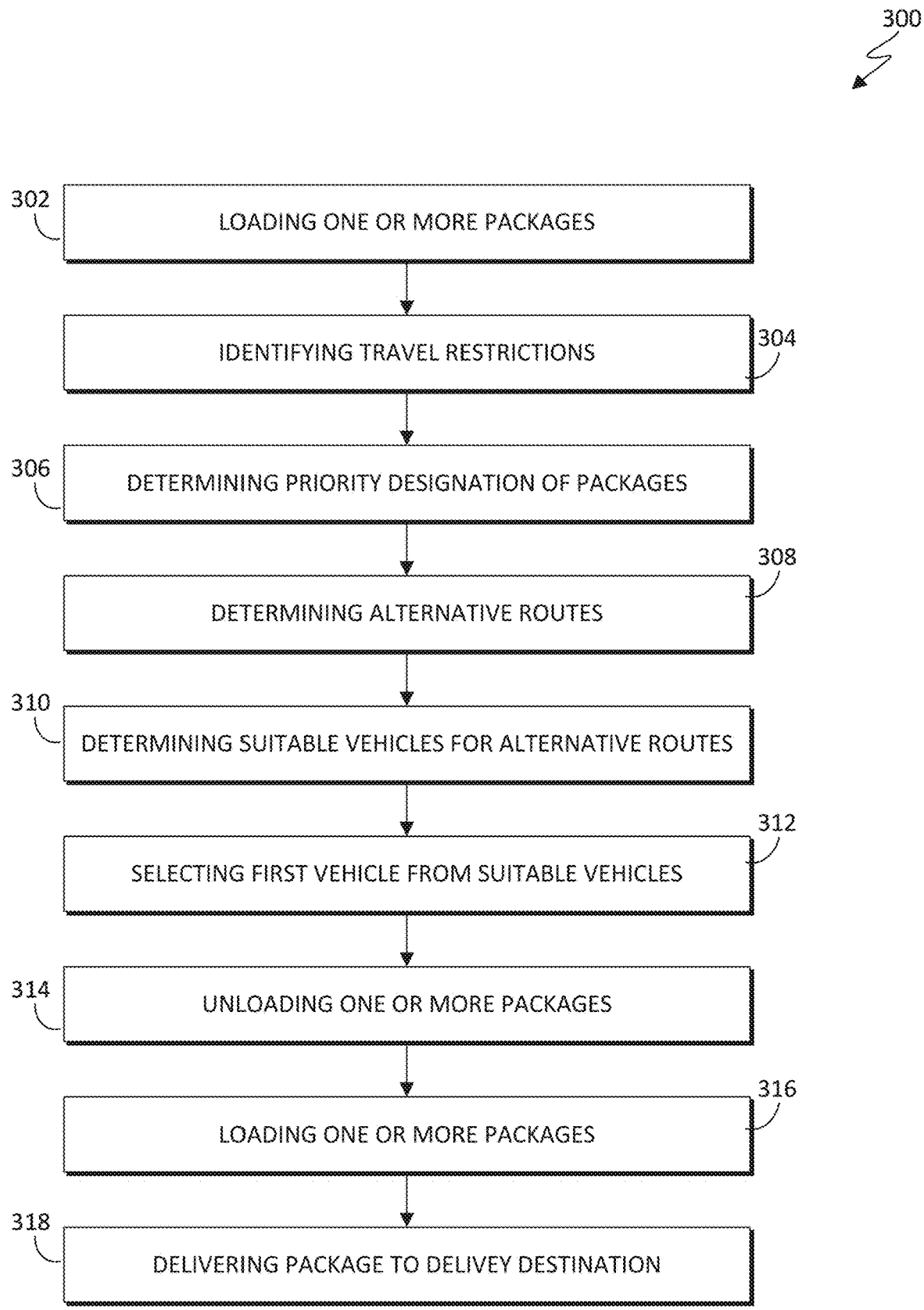
FIG. 3 is a high-level flowchart illustrating the delivery component 111, designated as 300, in accordance with another embodiment of the present invention.

FIG. 3 is a high-level flowchart illustrating the delivery component 111, designated as 300, in accordance with an embodiment of the present invention (refer to FIG. 2 to help follow the process). Recall the previous scenario based on FIG. 2 but with additional facts. There is another package, 211 in addition to package 210. There is another customer, 221 who ordered package 211. Both customers still reside in a densely populated cities that have road restrictions, where the main road (i.e., 201) does not allow large commercial vehicle, such as an 18-wheeler truck (i.e., 102). Package 211 contains jewelry items.

Delivery component 111 loads the packages (step 302). In an embodiment, delivery component 111, through logistics module 124 and vehicle module 121 loads multiple packages into a large delivery vehicle destined for a densely populated city. For example, referring to the FIG. 2, delivery component 111, through logistics module 124 and vehicle module 121 loads multiple packages (e.g., 210 and 211) onto a large vehicle (102 of FIG. 2) at the originating warehouse (i.e., 230) destined for customer 220 and 221.

Delivery component 111 identifies one or more travel restrictions (step 304). In an embodiment, delivery component 111, through navigation module 122, identifies one or more travel restrictions at the delivery destination. For example, referring to the FIG. 2, delivery component 111, through navigation module 122, identifies that on road 201 (leading into the city) has vehicle prohibition during the weekdays where large commercial vehicles, such as 102, would not be allowed between the hour of 8 AM and 5 PM.

Delivery component 111 determines priority designation of one or more packages (step 306). In an embodiment, delivery component 111, through packages module 123, determines priority designation of one or more packages associated with the initial delivery route (i.e., how many packages are high priority and how many are not). For example, referring to the FIG. 2, delivery component 111, through packages module 123, identifies package 210 as high priority (i.e., perishable seafood delicacy) while package 211 is low priority.

Delivery component 111 determines alternative route (step 308). In an embodiment, delivery component 111, through logistic module 124 and/or navigation module 122, determines one or more alternative delivery routes based travel restrictions and the prioritization of the packages. For example, referring to the FIG. 2, delivery component 111, through logistic module 124 and/or navigation module 122, may determine that the best route is still road 201 despite the vehicle restriction and high priority for package 210 (48-hour delivery guarantee).

Delivery component 111 determines vehicle suitable for alternative route (step 310). In an embodiment, delivery component 111, through logistic module 124 and/or navigation module 122 determines one or more vehicles suitable for the one or more alternative routes and also conforms to the one or more travel restrictions (i.e., vehicle prohibition during rush hour). For example, referring to the FIG. 2, delivery component 111, through logistic module 124 and/or navigation module 122, determine that in order to meet the 48-hour time window for package 210, it is optimal to utilize smaller vehicles (103), such as a two-wheeler while keep using the exist route (i.e., road 201).

Delivery component 111 selects a vehicle suitable for delivery (step 312). In an embodiment, delivery component 111, through logistics module 124, selects a suitable/optimal vehicle from the one or more vehicles to deliver the one or more packages to a delivery destination. For example, referring to the FIG. 2, delivery component 111, through logistic module 124 and/or navigation module 122, had determined (from step 310) that a two-wheeler would be optimal to deliver package 210 to customer 220. Therefore, delivery component 111, through logistics module 124 ensures that there is a two-wheeler vehicle available in the vicinity to deliver package 210. Once availability is confirmed, logistics module 124 can confirm/book/designate that two-wheeler for delivery package 210 (and any other packages that needs to be delivered close/on route to customer 220).

Delivery component 111 unloads package from the large vehicle (step 314). In an embodiment, delivery component 111, through logistics module 124, unloads packages from the large vehicle onto a warehouse (e.g., on-demand or destination warehouse). The packages can include high priority packages or any other packages that grouped together based on destination address in close proximity to the high priority package(s). For example, referring to the FIG. 2, delivery component 111, through logistics module 124, unloads package 210 and package 211 from the large vehicle (102) onto destination warehouse 231.

Delivery component 111 loads package(s) onto another vehicle (step 316). In an embodiment, delivery component 111, through logistics module 124, loads high priority designation package (along with others) onto a smaller vehicle, two-wheeler from destination warehouse 231. For example, referring to the FIG. 2, delivery component 111, through logistics module 124, load package 210 onto two-wheeler vehicle (103) from destination warehouse 231. Simultaneously, delivery component 111, through logistics module 124, load package 211 onto a drone (i.e., 103), destine for customer 221.

Delivery component 111 delivers the package(s) to the customer (step 318). In an embodiment, delivery component 111 delivers the package(s) to the delivery destination by the smaller vehicle (e.g., two-wheeler and/or drone). The high priority package was delivered within the required time frame while low priority package was also delivered within the required time frame. For example, referring to the FIG. 2, delivery component 111, through logistics module 124, deliver package 210 to customer 220 via two-wheeler and deliver package 211 to customer 221 via drone.

FIG. 4, designated as 400, depicts a block diagram of components of delivery component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and datax 10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Delivery component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., delivery component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., delivery component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for managing delivery of packages utilizing one or more vehicles and one or more on-demand warehouses, the computer-implemented method comprising:

instructing, by one or more processors, to load one or more packages onto a large delivery vehicle of the one or more vehicles for a delivery route;

identifying, by the one or more processors, one or more travel restrictions associated with one or more delivery destinations;

determining, by the one or more processors, priority designation of one or more packages associated with the delivery route associated with the one or more delivery destinations, wherein the one or more packages comprise of a high priority designation and a medium and low priority designation;

determining, by the one or more processors, one or more alternative routes associated with the one or more delivery destinations based on the one or more travel restrictions and identifying the priority designation of the one or more packages;

determining, by the one or more processors, a first vehicle from one or more vehicles for the one or more alternative routes and the first vehicle conforms to the one or more travel restrictions;

selecting, by the one or more processors, the first vehicle to deliver the one or more packages with the high priority designation to a first delivery destination of the one or more delivery destinations;

instructing, by the one or more processors, a drone to autonomously unload only the one or more packages with the high priority designation from the large delivery vehicle;

instructing, by the one or more processors, the drone to autonomously load the one or more packages with the high priority designation onto the first vehicle;

determining, by the one or more processors, a need for the one or more on-demand warehouses along the delivery route for the one or more packages with medium and low priority designation, wherein the one or more on-demand warehouses are temporary space that can be booked on short notice;

booking, by the one or more processors, the one or more on-demand warehouses and storing, temporarily, the one or more packages into the one or more on-demand warehouses;

instructing, by the one or more processors, a second vehicle to deliver the one or more packages with medium and low priority designation from the one or more on-demand warehouses to a second delivery destination; and instructing, by the one or more processors, a first vehicle to deliver, the one or more packages with the high priority designation to the first delivery destination.

2. The computer-implemented method of claim 1, wherein the one or more travel restrictions comprises of banning commercial traffic through a city between certain hours, traffic congestion and adverse weather condition.

3. The computer-implemented method of claim 1, wherein determining the priority designation of the one or more packages further comprises:

assigning a priority to the one or more packages based on the content and/or service paid by user, wherein the priority comprises of, low, medium and high priority.

4. The computer-implemented method of claim 3, wherein the one or more alternative routes further comprises:

determining that the one or more alternative routes is the delivery route based on the one or more travel restrictions; and booking on-demand warehouse along the delivery route to minimize cost.

5. The computer-implemented method of claim 4, wherein the one or more vehicles suitable is a two-wheel vehicle based on the delivery route and the on-demand warehouse.

6. The computer-implemented method of claim 1, wherein the one or more vehicles are selected from the group consisting of an 18-wheeler truck, a box van, a two-wheel vehicle and a drone.

7. The computer-implemented method of claim 1, wherein the high priority designation package has a guaranteed delivery time of 48 hours or less.

8. A computer program product for managing delivery of packages utilizing one or more vehicles and one or more on-demand warehouses, the computer program product comprising:
  one or more computer readable storage media and program instructions stored on the one or more computer readable storage media, the program instructions comprising:
    program instructions to load one or more packages onto a large delivery vehicle of the one or more vehicles;
    program instructions to identify one or more travel restrictions associated with one or more delivery destinations;
    program instructions to determine priority designation of one or more packages associated with the delivery route associated with the one or more delivery destinations, wherein the one or more packages comprise of a high priority designation and a medium and low priority designation, wherein the one or more packages comprise of a high priority designation and a medium and low priority designation;
    program instructions to determine one or more alternative routes associated with the one or more delivery destinations based on the one or more travel restrictions and identifying the priority designation of the one or more packages;
    program instructions to determine a first vehicle from one or more vehicles for the one or more alternative routes and the first vehicle conforms to the one or more travel restrictions;
    program instructions to select the first vehicle to deliver the one or more packages with the high priority designation to a first delivery destination of the one or more delivery destinations;
    program instructions to instruct a drone to autonomously unload only the one or more packages with the high priority designation from the large delivery vehicle;
    program instructions to instruct the drone to autonomously load the one or more packages with the high priority designation onto the first vehicle;
    program instructions to determine a need for the one or more on-demand warehouses along the delivery route for the one or more packages with medium and low priority designation, wherein the one or more on-demand warehouses are temporary space that can be booked on short notice;
    program instructions to book the one or more on-demand warehouses and storing, temporarily, the one or more packages into the one or more on-demand warehouses;
    program instructions to deliver, by using a second vehicle, the one or more packages with medium and low priority designation from the one or more on-demand warehouses to a second delivery destination; and
    program instructions to deliver, by the first vehicle, the one or more packages with the high priority designation to the first delivery destination.

9. The computer program product of claim 8, wherein the one or more travel restrictions comprises of banning commercial traffic through a city between certain hours, traffic congestion and adverse weather condition.

10. The computer program product of claim 9, wherein program instructions to determine the priority designation of the one or more packages further comprises:
  program instructions to assign a priority to the one or more packages based on the content and/or service paid by user, wherein the priority comprises of, low, medium and high priority.

11. The computer program product of claim 10, wherein the one or more alternative routes further comprises:
  program instructions to determine that the one or more alternative routes is the delivery route based on the one or more travel restrictions; and
  program instructions to book on-demand warehouse along the delivery route to minimize cost.

12. The computer program product of claim 11, wherein the one or more vehicles suitable is a two-wheel vehicle based on the delivery route and the on-demand warehouse.

13. The computer program product of claim 8, wherein the one or more vehicles are selected from the group consisting of an 18-wheeler truck, a box van, a two-wheel vehicle and a drone.

14. The computer program product of claim 8, wherein the high priority designation package has a guaranteed delivery time of 48 hours or less.

15. A computer system for managing delivery of packages utilizing one or more vehicles and one or more on-demand warehouses, the computer system comprising:
  one or more computer processors;
  one or more computer readable storage media; and
  program instructions stored on the one or more computer readable storage media for execution by at least one of the one or more computer processors, the program instructions comprising:
    program instructions to load one or more packages onto a large delivery vehicle of the one or more vehicles;
    program instructions to identify one or more travel restrictions associated with one or more delivery destinations;
    program instructions to determine priority designation of one or more packages associated with the delivery route associated with the one or more delivery destinations, wherein the one or more packages comprise of a high priority designation and a medium and low priority designation, wherein the one or more packages comprise of a high priority designation and a medium and low priority designation;
    program instructions to determine one or more alternative routes associated with the one or more delivery destinations based on the one or more travel restrictions and identifying the priority designation of the one or more packages;
    program instructions to determine a first vehicle from one or more vehicles for the one or more alternative routes and the first vehicle conforms to the one or more travel restrictions;
    program instructions to select the first vehicle to deliver the one or more packages with the high priority designation to a first delivery destination of the one or more delivery destinations;
    program instructions to instruct a drone to autonomously unload only the one or more packages with the high priority designation from the large delivery vehicle;
    program instructions to instruct the drone to autonomously load the one or more packages with the high priority designation onto the first vehicle;
    program instructions to determine a need for the one or more on-demand warehouses along the delivery route for the one or more packages with medium and low priority designation, wherein the one or more on-demand warehouses are temporary space that can be booked on short notice;

program instructions to book the one or more on-demand warehouses and storing, temporarily, the one or more packages into the one or more on-demand warehouses;

program instructions to deliver, by using a second vehicle, the one or more packages with medium and low priority designation from the one or more on-demand warehouses to a second delivery destination; and program instructions to deliver, by the first vehicle, the one or more packages with the high priority designation to the first delivery destination.

16. The computer system of claim 15, wherein the one or more travel restrictions comprises of banning commercial traffic through a city between certain hours, traffic congestion and adverse weather condition.

17. The computer system of claim 15, wherein program instructions to determine the priority designation of the one or more packages further comprises:

program instructions to assign a priority to the one or more packages based on the content and/or service paid by user, wherein the priority comprises of, low, medium and high priority.

18. The computer system of claim 17, wherein the one or more alternative routes further comprises:

program instructions to determine that the one or more alternative routes is the delivery route based on the one or more travel restrictions; and program instructions to book on-demand warehouse along the delivery route to minimize cost.

19. The computer system of claim 18, wherein the one or more vehicles suitable is a two-wheel vehicle based on the delivery route and the on-demand warehouse.

20. The computer system of claim 15, wherein the one or more vehicles are selected from the group consisting of an 18-wheeler truck, a box van, a two-wheel vehicle and a drone.

* * * * *